(12) United States Patent
Miyagawa et al.

(10) Patent No.: US 7,216,901 B2
(45) Date of Patent: May 15, 2007

(54) OPERATION FORCE TRANSMITTING MEMBER FOR DOOR LOCK APPARATUS

(75) Inventors: Masazumi Miyagawa, Kanagawa (JP); Michio Ohashi, Kanagawa (JP)

(73) Assignees: Ohi Seisakusho Co., Ltd., Yokohama-shi (JP); Valeo Securite Habitacle, Creteil (FR)

( * ) Notice: Subject to any disclaimer, the term of this patent is extended or adjusted under 35 U.S.C. 154(b) by 51 days.

(21) Appl. No.: 10/366,515

(22) Filed: Feb. 14, 2003

(65) Prior Publication Data
US 2003/0173786 A1 Sep. 18, 2003

(51) Int. Cl.
*E05C 3/16* (2006.01)
*F16C 1/10* (2006.01)

(52) U.S. Cl. ............... 292/225; 292/336.3; 74/500.5

(58) Field of Classification Search ............... 292/225, 292/336.3, 28, 38, 50, 84, 125, 133, 141, 292/171, 235; 74/500.5, 501.6, 502.6
See application file for complete search history.

(56) References Cited

U.S. PATENT DOCUMENTS

| | | | | |
|---|---|---|---|---|
| 2,102,775 A | * | 12/1937 | Woodhead | 220/262 |
| 2,732,861 A | * | 1/1956 | Gilmore | 285/333 |
| 3,205,727 A | * | 9/1965 | Sevrence | 74/500.5 |
| 3,221,572 A | * | 12/1965 | Swick | 74/502.4 |
| 3,542,980 A | * | 11/1970 | Hamilton | 285/205 |
| 3,589,209 A | * | 6/1971 | Howell | 74/501.6 |
| 3,836,269 A | * | 9/1974 | Koscik | 403/197 |
| 4,304,149 A | * | 12/1981 | Heimann | 74/502.4 |
| 4,456,289 A | * | 6/1984 | Badiali | 292/28 |
| 4,738,155 A | * | 4/1988 | Stocker | 74/502.6 |
| 4,889,005 A | * | 12/1989 | Crack | 74/501.6 |
| 4,929,007 A | * | 5/1990 | Bartczak et al. | 292/336.3 |
| 4,936,611 A | * | 6/1990 | Palvolgyi | 292/28 |
| 5,035,452 A | * | 7/1991 | Rogers | 292/125 |
| 5,174,170 A | * | 12/1992 | Kato et al. | 74/502.6 |
| 5,236,233 A | * | 8/1993 | Fukumoto et al. | 292/144 |
| 5,419,616 A | * | 5/1995 | Paetzold | 297/378.12 |
| 5,531,489 A | * | 7/1996 | Cetnar | 292/225 |
| 5,546,827 A | * | 8/1996 | Pospisil | 74/502.4 |
| 5,570,611 A | * | 11/1996 | Pospisil et al. | 74/502.6 |
| 5,738,394 A | * | 4/1998 | Arabia et al. | 292/216 |
| 5,857,386 A | * | 1/1999 | Ruhlman | 74/502.4 |
| 5,988,011 A | * | 11/1999 | Crepin | 74/502.4 |

(Continued)

FOREIGN PATENT DOCUMENTS

| | | |
|---|---|---|
| DE | 197 28 967 | 1/1999 |
| DE | 198 09 449 | 9/1999 |
| DE | 100 58 636 | 5/2002 |
| JP | 58-065312 | 4/1983 |
| WO | WO 00/79143 | 12/2000 |

*Primary Examiner*—Brian E. Glessner
*Assistant Examiner*—Carlos Lugo
(74) *Attorney, Agent, or Firm*—Foley & Lardner LLP

(57) ABSTRACT

An operation force transmitting member of a door lock apparatus has a guide tube and an inner cable passed through the guide tube and is connected to one of the door lock apparatus and an operating device for operating the door lock apparatus at the upper end portion thereof and to the other of the door lock apparatus and the operating device at the lower end portion thereof. In this operation force transmitting member, a cover member, which is enabled to close the upper face of the guide tube during non-operation of the operating device, is provided on the inner cable projecting from the upper face of the guide tube.

20 Claims, 5 Drawing Sheets

U.S. PATENT DOCUMENTS

| | | |
|---|---|---|
| 6,014,910 A | 1/2000 | Oda et al. |
| 6,032,987 A * | 3/2000 | Fukumoto et al. ........... 292/216 |
| 6,070,921 A * | 6/2000 | Valasin ....................... 292/216 |
| 6,092,845 A * | 7/2000 | Koenig ....................... 292/225 |
| 6,142,035 A * | 11/2000 | Babatz et al. .............. 74/501.6 |
| 6,168,216 B1 * | 1/2001 | Nakajima et al. ........... 292/201 |
| 6,209,414 B1 * | 4/2001 | Uneme ...................... 74/502.4 |
| 6,263,757 B1 * | 7/2001 | Kawahara .................. 74/502.6 |
| 6,742,819 B2 * | 6/2004 | So et al. ..................... 292/225 |

* cited by examiner

OPERATION FORCE TRANSMITTING MEMBER FOR DOOR LOCK APPARATUS

The present application is based on Japanese Paten Application No. 2002-40674, the entire contents of which are incorporated herein by reference.

BACKGROUND OF THE INVENTION

1. Field of the Invention

This invention relates to a door lock apparatus, particularly to an operation force transmitting member of the door lock apparatus.

2. Related Art

As shown in FIG. 6, an operation force transmitting member 101 of a conventional door lock apparatus has a guide tube 102 and an inner cable 103 passed through this guide tube 102. The lower end portion of the inner cable 103 is connected to an operation lever of the door lock apparatus (not shown) placed inside a door. Similarly, the upper end portion thereof is connected to a moving part 104a of an operating device 104 placed at the side of an outer panel of the door. When the operating device 104 is operated in the direction of an arrow, the inner cable 103 is drawn upwardly thereby operating the operation lever of the door lock apparatus.

However, in the operation force transmitting member 101, because the upper end portion of the guide tube 102 fixed to the side of the operating device 104 is exposed, rainwater A enters the door through the operating device and then goes along the inner cable 103 and finally flows into the guide tube 102 from an insertion hole 102a thereof. Thus, there is a fear that rainwater enters the door lock apparatus and causes malfunctions of the door lock apparatus and the operation force transmitting member 101.

SUMMARY OF THE INVENTION

In view of the problems, an object of the invention is to provide an operation transmitting member of a door lock apparatus enabled to prevent rainwater from entering the guide tube and to obtain a stable operation over a long time.

According to the invention, the problems are solved by the following means.

(1) There is provided an operation force transmitting member, which has a guide tube and an inner cable passed through the guide tube and is connected to one of a door lock apparatus and an operating device for operating the door lock apparatus at the upper end portion thereof and to the other of the door lock apparatus and the operating device at the lower end portion thereof. In the first means, a cover member, which is enabled to cover the upper face of the guide tube during non-operation of the operating device, is provided on the inner cable projecting from the upper face of the guide tube.

(2) In the above (1), a lower side face of the cover member abuts against the upper face of the guide tube to thereby enable closing of the upper face of the guide tube. Further, an outer diameter of the cover member is larger than an inner diameter of the guide tube.

(3) There is provided an operation force transmitting member, which has a guide tube and an inner cable passed through the guide tube and is connected to one of a door lock apparatus and an operating device for operating the door lock apparatus at the upper end portion thereof and to the other of the door lock apparatus and the operating device at the lower end portion thereof. In the third means, an elastic cap member is put on the upper end portion of the guide tube. A cover member, which is enabled to cover an upper face of the elastic cap member during non-operation of the operating device, is provided on the inner cable projecting from the upper face of the elastic cap member.

(4) In the above (3), a lower side face of the cover member abuts against the upper face of the elastic cap member to thereby enable closing of the upper face of the elastic cap member. Further, the cover member covers the upper face of the elastic cap member during non-operation of the operating device.

DETAILED DESCRIPTION OF THE PREFERRED EMBODIMENTS

Hereinafter, an embodiment of the invention is described with reference to FIGS. 1 and 2.

Figure 1:
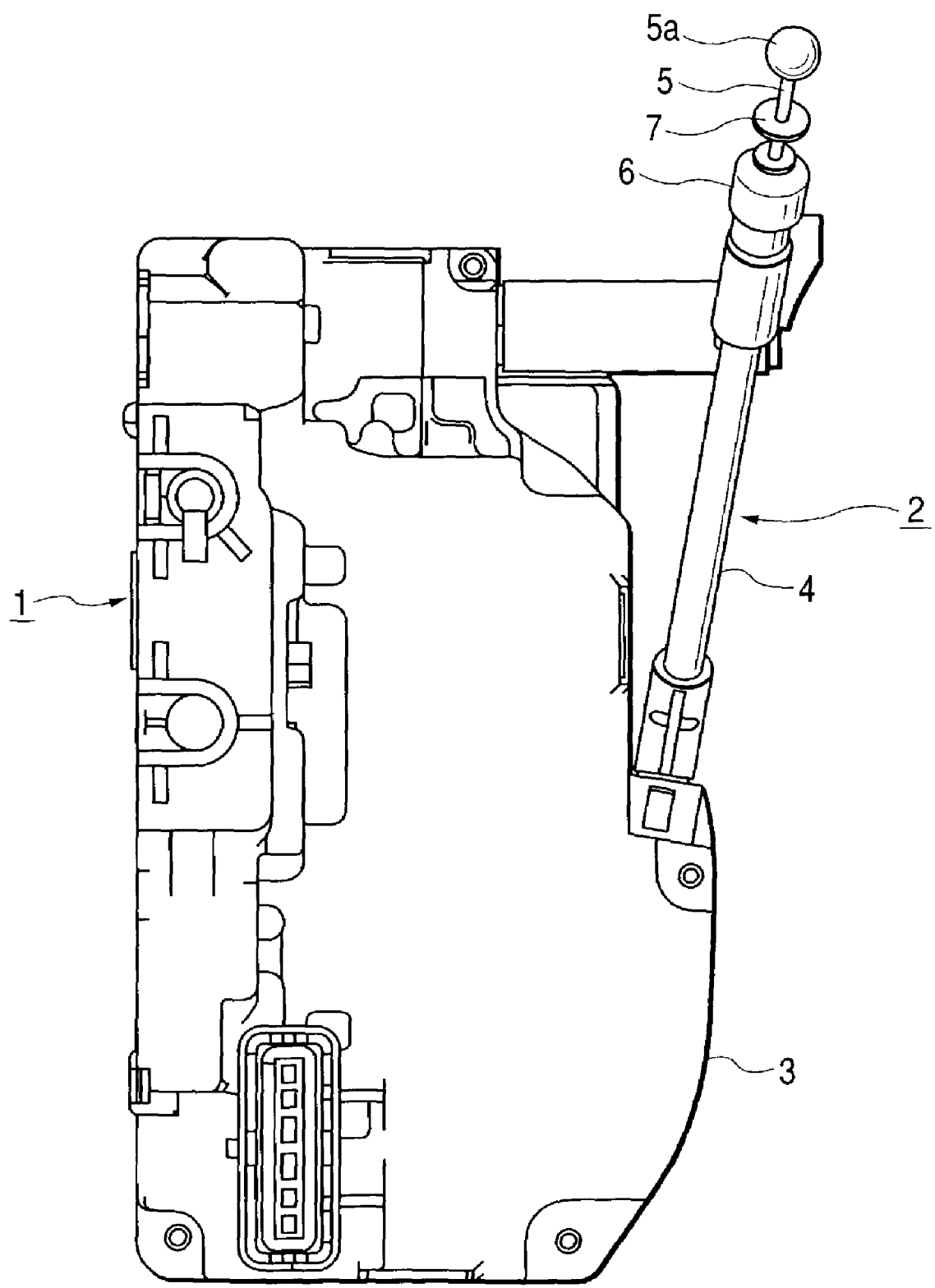
FIG. 1 is a front view of a door lock apparatus to which an embodiment according to the invention is applied.
Figure 2:
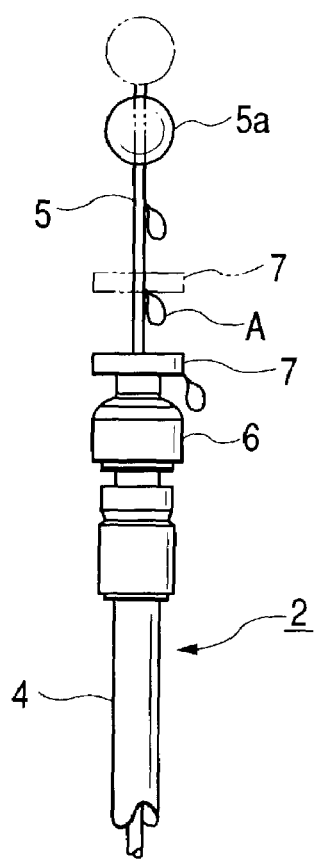
FIG. 2 is a front view of an upper part of an operation force transmitting member that is a first embodiment according to the invention.

FIG. 1 is a front view of a door lock apparatus 1. FIG. 2 is a front view of an upper part of an operation force transmitting member 2.

The door lock apparatus 1 is placed in an automobile door. A housing 3 accommodates a gear mechanism, which is disengageable from a striker (not shown) secured to an automobile body, and also accommodates various kinds of levers (not shown) linked to the gear mechanism. The door lock apparatus constitutes a door lock system by connected to an outer lever (not shown) as operating device through the operation force transmitting member 2.

The operation force transmitting member 2 has a guide tube 4 and an inner cable 5 passed through the guide tube 4. The lower end portion of the guide tube 4 is fixed to the housing 3. The lower end portion of the inner cable 5 enters the housing 3 and is connected to the outer lever among the various kinds of levers. Incidentally, the lower end portion of the guide tube 4 is tightly fixed to the housing 3 so that rainwater falling along the outer peripheral surface of the guide tube 4 is prevented from entering the housing 3.

The upper end portion of the guide tube 4 is fixed to a stationary part of an operating device (not shown) mounted to the outer panel of the door. Further, a spherical terminal portion 5a provided at the upper end of the inner cable 5 is connected to the moving part of the operating device, similarly as that of the conventional door lock apparatus. Incidentally, the operating device is disposed above the door lock apparatus 1.

The operation force transmitting member 2 is installed in the door in such a way as to be directed upwardly and downwardly. An elastic cap member 6 is fitted onto the upper end portion of the guide tube 4.

A metallic disk-like cover member 7 placed below the terminal portion 5a is secured to the inner cable 5 projecting from the upper face of the elastic cap member 6. The cover member 7 is wider than the upper face of the elastic cap member 7. During non-operation of the operating device, a lower side face of the cover member 7 abuts against the upper face of the elastic cap member 6, as indicated by solid lines in FIG. 2. During operation of the operating device, the lower side face of the cover member 7 moves upwardly together with the inner cable 5 and is separated from the upper face of the elastic cap member 6, as indicated by imaginary lines in FIG. 2.

During operation of the operating device, an outer lever of the door lock apparatus 1 is operated by means of the inner cable 5. Consequently, the engagement between the gear mechanism and the striker is canceled.

As above described, during non-operation of the operating device, the cover member 7 abuts against the upper face of the elastic cap member 6 thereby closing the upper face of the guide tube 4. Therefore, rainwater A falling along the operating device and the inner cable is received by the upper face of the cover member 7, and then directed to an outer side face of the elastic cap member 6. Consequently, rainwater is surely prevented from entering the guide tube 4. Incidentally, although the cover member 7 closes the upper face of the guide tube 4 in the embodiment, it is not limited to such a configuration. By forming an outer diameter of the cover member 7 to be larger than an inner diameter (opening diameter) of the guide tube 4 or the elastic cap member 6 so as to cover the upper face thereof, the rainwater A is suitably guided to the outer side face of the elastic cap member 6 even if the cover member 7 does not abut with the guide tube during the non-operating time. Therefore rainwater A can be also prevented from entering the guide tube 4 in such a configuration.

Figure 7:
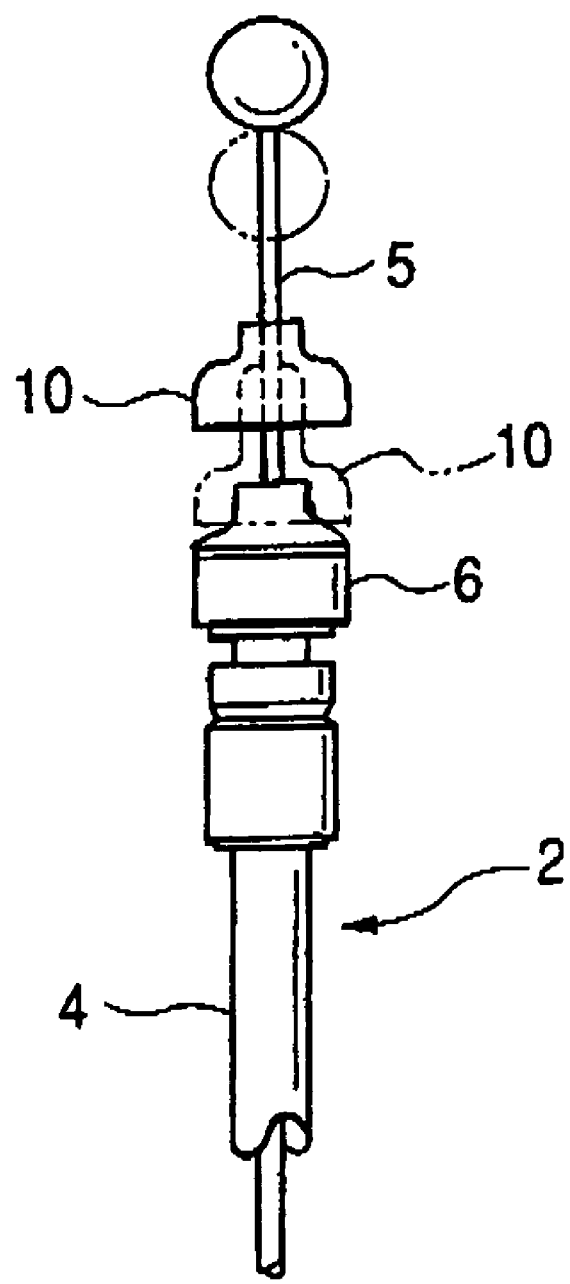
FIG. 7 is a front view of an upper part of an operation force transmitting member according to another embodiment of the invention.

FIG. 7 is a front view of an upper part of an operation force transmitting member according to another embodiment of the invention, which shows the cover member 10 not abutting with the guide tube 4 during the non-operating time (indicated by the dashed line position of the cover member 10, with the non-dashed line position of the cover member corresponding to the operating time).

Further, the cover member 7 is formed from metal and secured to the inner cable 5. Therefore, an amount of downward displacement of the inner cable 5 is regulated by causing the cover member 7 to abut against the upper face of the elastic cap member 6. Consequently, the lower end portion of the inner cable 5 can easily be connected to the outer lever of the door lock apparatus 1.

Incidentally, the elastic cap member 6 is not a indispensable constituent feature. That is, the elastic cap member 6 may be omitted, but the lower side face of the cover member 7 may be made to directly abut against and close the upper face of the guide tube 4. Consequently, rainwater can be prevented from entering the guide tube 4. In this case, the lower side face of the cover member 7 is set to be wider than the upper face of the guide tube 4. Rainwater falling from the upper end of the inner cable 5 is received by the upper face of the cover member 7, and directed to the outside of the guide tube 4.

Although the embodiments of the invention have been described in the foregoing description, various modifications and alterations may be made without departing from the gist of the invention.

Figure 3:
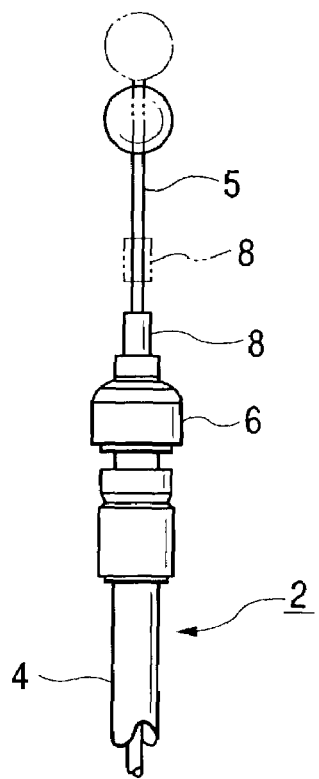
FIG. 3 is a front view of an upper part of an operation transmitting member that is a second embodiment according to the invention.

For example, similarly as the cover member of the second embodiment shown in FIG. 3, the cover member 8 may be shaped like a cylinder. In this case, during non-operation of the operating device, the cover member 8 is made to abut against the upper face of the elastic cap member 6, as indicated by solid lines. During operation of the operating device, the cover member 8 is separated from the upper face of the elastic cap member 6, as indicated by imaginary lines.

Figure 4:
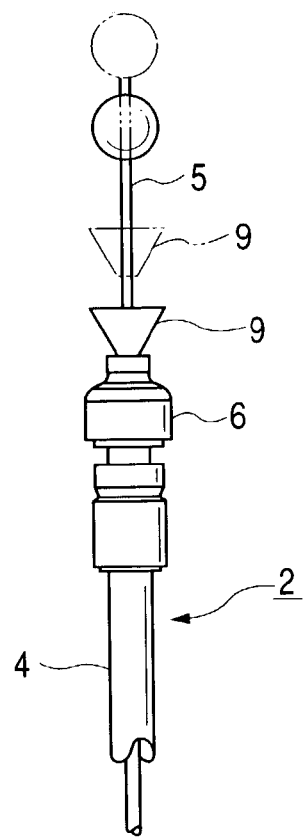
FIG. 4 is a front view of an upper part of an operation transmitting member that is a third embodiment according to the invention.

Similarly as the cover member of the third embodiment shown in FIG. 4, the cover member 9 maybe shaped like an inverted frustum. In this case, during non-operation of the operating device, the cover member 9 is made to abut against the upper face of the elastic cap member, as indicated by solid lines. During operation of the operating device, the cover member 9 is made to separate from the upper face of the elastic cap member 6, as indicated by imaginary lines.

Figure 5:
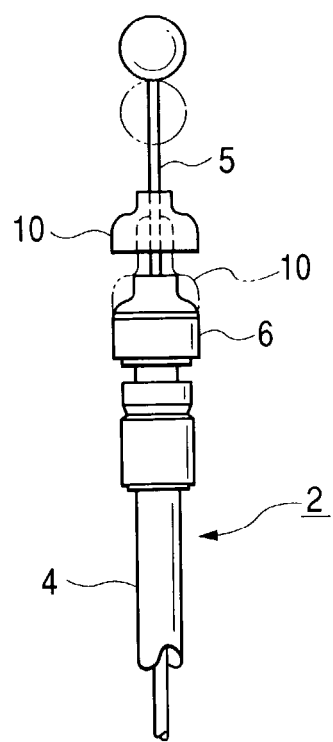
FIG. 5 is a front view of an upper part of an operation transmitting member that is a fourth embodiment according to the invention.
Figure 6:
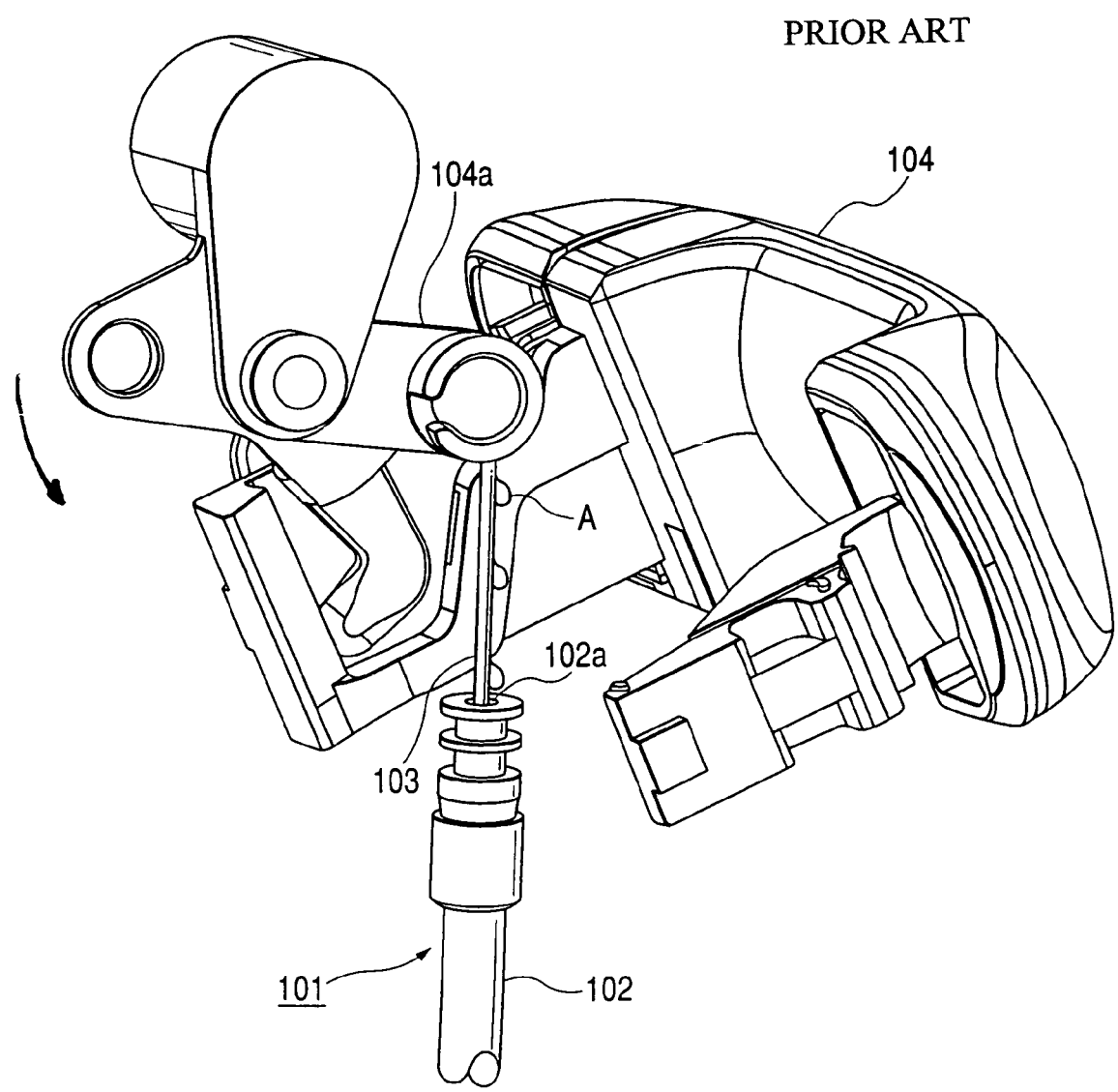
FIG. 6 is a perspective view of an operating device and an operation force transmitting member according to the related art.

Similarly as the cover member of the fourth embodiment shown in FIG. 5, the cover member 10 is formed from an elastic material, such as rubber, and shaped like an umbrella. In this case, during non-operation of the operating device, the cover member 10 is fitted onto the outer peripheral face of the elastic cap member 6. Further, during operation of the operating device, the cover member 10 is separated from the elastic cap member 6.

In each of the second, third, and fourth embodiments, the elastic cap member 6 may be omitted. Alternatively, the operating device may be a key cylinder.

The invention can provide the following advantages.

(a) According to the invention, the cover member enabled to cover the upper face of the guide tube during non-operation of the operating device is provided on the inner cable projecting from the upper face of the guide tube. Consequently, with the cover means, the first means can prevent rainwater from entering the guide tube to thereby obtain a stable operation over a long time.

(b) According to the invention, rainwater falling from the upper end of the inner cable is directed to the outside of the guide tube. Thus, the second means can surely prevent rainwater from entering the guide tube.

(c) According to the invention, the elastic cap member is put on the upper end portion of the guide tube. Moreover, the cover member enabled to cover the upper face of the elastic cap member during non-operation of the operating device is provided on the inner cable projecting from the upper face of the elastic cap member. Consequently, with the configuration including the cover means and the elastic cap member, the third means can prevent rainwater from entering the guide tube to thereby obtain a stable operation over a long time.

(d) According to the invention, rainwater falling from the upper end of the inner cable is directed to the outside of the elastic cap member. Thus, the fourth means can more surely prevent rainwater from entering the guide tube.

What is claimed is:

1. An operation force transmitting member which connects a door lock apparatus to an operating device for operating said door lock apparatus at both end portions thereof, said operation force transmitting member comprising:

a guide tube;

an inner cable passed through said guide tube;

an elastic cap member covering an upper end portion of said guide tube;

a cover member attached on said inner cable at a portion which projects from an upper face of said guide tube, a lower end of said cover member having a round shape, the lower end of said cover member facing the upper face of said guide tube, wherein an outer diameter of said cover member is larger than an inner diameter of said guide tube, and said cover member covers an upper face of said elastic cap member during non-operation of said operating device, in which said door lock apparatus is in an engaged state, said cover member being in contact with said elastic cap member during non-operation of said operating device, wherein, during operation of said operating device, in which said door lock apparatus is in a disengaged state, said lower side face of said cover member is spaced apart from said elastic cap member, and wherein said outer diameter of said cover member is larger than an outer diameter of said guide tube.

2. An operation force transmitting member according to claim 1, wherein said lower end of said cover member is wider than said upper face of said guide tube.

3. An operation force transmitting member according to claim 1, wherein said cover member is shaped in a disk-like shape.

4. An operation force transmitting member according to claim 1, wherein said cover member is shaped like an inverted frustum.

5. An operation force transmitting member according to claim 1, wherein said cover member is shaped like an umbrella.

6. An operation force transmitting member according to claim 5, wherein said cover member envelops a portion of said elastic cap member during non-operation of said operating device.

7. A door lock system according to claim 6, wherein said cover member does not envelop any portion of said elastic cap member during operation of said operating device.

8. An operation force transmitting member according to claim 1, wherein said cover member closes said upper face of said guide tube during non-operation of said operating device.

9. An operation force transmitting member according to claim 1, wherein the lower end of said cover member is wider than said upper face of said elastic cap member.

10. An operation force transmitting member according to claim 1, wherein said cover member includes an upper end in which the upper end of said cover member is located further from said door lock apparatus than the lower end of said cover member.

11. An operation force transmitting member which connects a door lock apparatus to an operating device for operating said door lock apparatus at both end portions thereof, said operation force transmitting member comprising:

a guide tube;

an inner cable passed through said guide tube;

an elastic cap member covering an upper end portion of said guide tube; and a cover member attached on said inner cable at a portion which projects from an upper face of said elastic cap member, wherein an outer diameter of said cover member is larger than an inner diameter of said guide tube, and said cover member covers said upper face of said elastic cap member during non-operation of said operating device, said cover member being in contact with said upper face of said elastic cap member during non-operation of said operating device, where in a lower end of said cover member abuts against said upper face of said elastic cap member to thereby close said upper face of said elastic cap member, and wherein said lower end of said cover member is wider than said upper face of said elastic cap member.

12. An operation force transmitting member according to claim 11, wherein said cover member closes said upper face of said elastic cap member during non-operation of said operating device.

13. An operation force transmitting member according to claim 11, wherein said cover member is shaped like an umbrella.

14. An operation force transmitting member according to claim 11, wherein said cover member has an umbrella shape.

15. A door lock system comprising:

a door lock apparatus;

an operating device for operating said door lock apparatus; and an operation force transmitting member connecting said door lock apparatus to said operating device at both end portions thereof, said operation force transmitting member including:

a guide tube, an elastic cap member covering an upper end portion of said guide tube, an inner cable passed through said guide tube, and a cover member attached on said inner cable at a portion which projects from an upper face of said guide tube, a lower end of said cover member having a round shape, the lower end of said cover member facing the upper face of said guide tube, wherein an outer diameter of said cover member is larger than an inner diameter and an outer diameter of said guide tube, said cover member covers an upper face of said elastic cap member during non-operation of said operating device, in which said door lock apparatus is in an engaged state, said cover member being in contact with said upper face of said elastic cap member during non-operation of said operating device, and said cover member is spaced apart from said elastic cap member during operation of said operating device, in which said door lock apparatus is in a disengaged state.

16. A door lock system according to claim 15, wherein said cover member has an umbrella shape.

17. A door lock system according to claim 15, wherein a lower end portion of the guide tube is connected to the door lock apparatus.

18. A door lock system according to claim 15, wherein the operating device is disposed above the door lock apparatus.

19. An operation force transmitting member which connects a passenger door lock apparatus of a vehicle to an operating device for operating said passenger door lock apparatus at both end portions thereof, said operation force transmitting member comprising:

a guide tube;

an inner cable passed through said guide tube;

an elastic cap member covering an upper end portion of said guide tube;

a cover member attached on said inner cable at a portion which projects from an upper face of said guide tube, wherein an outer diameter of said cover member is larger than an inner diameter of said guide tube, and said cover member covers an upper face of said elastic cap member during non-operation of said operating device, said cover member being in contact with said upper face of said elastic cap member during non-operation of said operating device, wherein, during operation of said operating device, a lower end of said cover member is spaced apart from said upper face of said elastic cap member, the lower end of said cover member facing the upper face of said elastic cap member, and wherein said cover member includes an upper end in which the upper end of said cover member is located further from said door lock apparatus than the lower end of said cover member, the lower end having a round shape.

20. An operation force transmitting member according to claim 19, wherein said cover member has an umbrella shape.

* * * * *